United States Patent
Sasaki et al.

(10) Patent No.: US 7,312,172 B2
(45) Date of Patent: Dec. 25, 2007

(54) DIELECTRIC CERAMIC COMPOSITION, ELECTRONIC DEVICE AND PRODUCTION METHODS OF THE SAME

(75) Inventors: Hiroshi Sasaki, Chuo-ku (JP); Hitoshi Tanaka, Chuo-ku (JP); Yasuo Niwa, Chuo-ku (JP); Matsumi Watanabe, Chuo-ku (JP); Tomoaki Nonaka, Chuo-ku (JP)

(73) Assignee: TDK Corporation, Tokyo (JP)

( * ) Notice: Subject to any disclaimer, the term of this patent is extended or adjusted under 35 U.S.C. 154(b) by 29 days.

(21) Appl. No.: 10/540,395

(22) PCT Filed: Dec. 17, 2003

(86) PCT No.: PCT/JP03/16178

§ 371 (c)(1),
(2), (4) Date: Jun. 23, 2005

(87) PCT Pub. No.: WO2004/063119

PCT Pub. Date: Jul. 29, 2004

(65) Prior Publication Data

US 2006/0234853 A1 Oct. 19, 2006

(30) Foreign Application Priority Data

Dec. 24, 2002 (JP) .............................. 2002-372783

(51) Int. Cl.
*C04B 35/465* (2006.01)
(52) U.S. Cl. ...................... 501/136; 428/210; 428/701; 428/702
(58) Field of Classification Search ................ 501/136, 501/135; 428/210, 701, 702
See application file for complete search history.

(56) References Cited

U.S. PATENT DOCUMENTS

| | | | |
|---|---|---|---|
| 5,319,517 A | 6/1994 | Nomura et al. | |
| 6,118,648 A | 9/2000 | Kojima et al. | |
| 6,396,681 B2 * | 5/2002 | Naito et al. | 361/321.4 |
| 6,617,273 B2 * | 9/2003 | Motoki et al. | 501/136 |
| 6,730,624 B2 * | 5/2004 | Motoki et al. | 501/136 |
| 2001/0040784 A1 | 11/2001 | Naito et al. | |
| 2004/0176238 A1 * | 9/2004 | Ito et al. | 501/136 |

FOREIGN PATENT DOCUMENTS

| | | |
|---|---|---|
| EP | 0 913 843 A1 | 5/1999 |
| JP | 63-126117 * | 5/1988 |
| JP | A 6-275459 | 9/1994 |
| JP | A 6-321630 | 11/1994 |
| JP | A 10-101417 | 4/1998 |
| JP | B2 2997236 | 10/1999 |
| JP | A-2001-097772 | 4/2001 |
| JP | A 2001-351828 | 12/2001 |
| JP | A-2002-080278 | 3/2002 |

* cited by examiner

Primary Examiner—Karl E Group
(74) Attorney, Agent, or Firm—Oliff & Berridge, PLC

(57) ABSTRACT

A dielectric ceramic composition, comprising a main component including at least a dielectric oxide having a composition expressed by $[(Ca_xSr_{1-x})O]_m[(Ti_yZr_{1-y-z}Hf_z)O_2]$, a first subcomponent including a Mn oxide and/or an Al oxide and a glass component, wherein "m", "x", "y" and "z" indicating composition mole ratios in the formula included in the main component are in relationships of $0.90 \leq m \leq 1.04$, preferably $1.005 \leq m \leq 1.025$, $0.5 \leq x < 1$, preferably $0.6 \leq x \leq 0.9$, $0.01 \leq y \leq 0.10$, preferably $0.02 \leq y \leq 0.07$ and $0 < z \leq 0.20$, preferably $0 < z \leq 0.10$.

13 Claims, 4 Drawing Sheets

US 7,312,172 B2

DIELECTRIC CERAMIC COMPOSITION, ELECTRONIC DEVICE AND PRODUCTION METHODS OF THE SAME

BACKGROUND OF THE INVENTION

1. Field of the Invention

The present invention relates to a dielectric ceramic composition, an electronic device and production methods of them, and particularly relates to a nonreducing temperature compensating dielectric ceramic composition preferably used for an electronic device, such as a multilayer ceramic capacitor, using a base metal as an internal electrode thereof.

2. Description of the Related Art

Multilayer ceramic capacitors are widely used as electronic devices, and the number used in one electronic device is also large. A multilayer ceramic capacitor is normally produced by stacking an internal electrode layer paste and a dielectric layer paste by a sheet method or a printing method, etc. and cofiring the result.

A dielectric ceramic material used for a multilayer ceramic capacitor, etc. of the related art has a property of getting reduced and becoming a semiconductor when fired in a reducing atmosphere. Therefore, as an internal electrode material, Pd and other precious metals, which do not melt at a temperature of sintering the dielectric ceramic material and are not oxidized even if fired under a high oxygen partial pressure of not bringing the dielectric ceramic material to be a semiconductor, have been used.

However, high prices of Pd and other precious metals have hindered a cost reduction of the multilayer ceramic capacitor much. Thus, use of relatively inexpensive base metals, such as Ni and a Ni alloy, as the internal electrode material has become dominant.

When using a base metal as a conductive material of the internal electrode layer, however, the internal electrode layer is oxidized when fired in the air. Accordingly, cofiring of the dielectric layer and internal electrode layer has to be performed in a reducing atmosphere.

However, when fired in a reducing atmosphere, the dielectric layer is reduced and the insulation resistance becomes low. Therefore, a nonreducing dielectric material has been proposed. But again, a multilayer ceramic capacitor using a nonreducing dielectric material has a disadvantage that the insulation resistance (IR) becomes poor when a thickness of the dielectric layer is made thin (5 µm or thinner) according to a reliability test.

On the other hand, demands have become stronger for a temperature compensating dielectric ceramic composition, wherein a temperature change of the capacitance is small, that is the capacitor-temperature coefficient is small, and able to be freely controlled in a range of $-50$ to $+150$ ppm/°C., so that a ceramic material capable of providing such a capacitor having a controllable low temperature coefficient has become necessary.

Note that, as described in the Japanese Patent Publication No. 2997236, there has been a proposal of a highly reliable nonreducing dielectric ceramic composition able to be sintered at 1300° C. or lower, wherein a temperature coefficient of the capacitance is small and able to be freely controlled in a range of $-15$ to $+150$ ppm/°C., the insulation resistance at 25°C. is $1\times10^{13}$ Ω or higher, the specific permittivity and dielectric loss tangent (tan δ) have a little frequency dependency, and accelerated lifetime of the insulation resistance is long even when the insulation layer is made thin. The dielectric ceramic composition is preferably used for a multilayer ceramic capacitor using a base metal, such as Ni, as an internal electrode.

SUMMARY OF THE INVENTION

However, experiments by the present inventors proved that the dielectric ceramic composition described in the above patent article 1 has uneven insulation resistance and is hard to reduce the insulation resistance defect rate.

The present invention was made in consideration of the above circumstances and has as an object thereof to provide highly reliable nonreducing dielectric ceramic composition preferably used as a dielectric layer of a multilayer ceramic capacitor, etc. using Ni or other base metal as the internal electrode, and able to be sintered at 1300° C. or lower, wherein a temperature coefficient of the capacitance is small and able to be freely controlled in a range of $-15$ to $+150$ ppm/°C., the insulation resistance at 25°C. is $1\times10^{13}$ Ω or higher, the specific permittivity and dielectric loss tangent (tan δ) have a little frequency dependency, accelerated lifetime of the insulation resistance is long and, moreover, a defect rate of the insulation resistance is low even when the insulation layer is made thin.

Also, another object of the present invention is to provide an electronic device, such as a multilayer ceramic capacitor, having a dielectric ceramic composition having the above characteristics as the dielectric layer, and production methods for producing the dielectric ceramic composition and the electronic device unfailingly with high productivity.

To attain the above objects, according to the present invention, there is provided a dielectric ceramic composition including at least a main component containing a dielectric oxide having a composition expressed by $[(Ca_xSr_{1-x})O]_m[(Ti_yZr_{1-y-z}Hf_z)O_2]$, a first subcomponent containing a Mn oxide and/or an Al oxide, and a glass component:

wherein "m", "x", "y" and "z" indicating composition mole ratios in the formula included in the main component are in relationships of $0.90 \leq m \leq 1.04$, preferably $1.005 \leq m \leq 1.025$, $0.5 \leq x < 1$, preferably $0.6 \leq x \leq 0.9$, $0.01 \leq y \leq 0.10$, preferably $0.02 \leq y \leq 0.07$, $0 < z \leq 0.20$ preferably $0 < z \leq 0.10$.

The dielectric ceramic composition according to the present invention basically has approximately the same composition as that in the patent article 1, so that it is possible to provide a highly reliable nonreducing dielectric ceramic composition able to be sintered at 1300° C. or lower, wherein a temperature coefficient of the capacitance is small and able to be freely controlled in a range of $-15$ to $+150$ ppm/°C., the insulation resistance at 25°C. is $1\times10^{13}$ Ω or higher, the specific permittivity and dielectric loss tangent (tan δ) have a little frequency dependency, and accelerated lifetime of the insulation resistance is long even when the insulation layer is made thin.

Particularly, in the present invention, being different from the patent article 1, Hf is added to the main component, so that a shrinkage curve at sintering becomes gentle comparing with that of a composition not added with Hf, and cracks and delamination are hard to be generated at the time of cofiring with an internal electrode. Also, since Hf is added to the main component, crystal grain growth is suppressed and a fine and uniform crystal can be realized comparing with the case of a composition not added with Hf. These were proved by the experiments by the present inventors.

As a result, according to the present invention, unevenness of insulation resistance caused by unevenness of the boundary face due to cracks, delamination or an uneven crystal can be suppressed.

Note that, in the present invention, when an x-value in the composition formula of the main component is too small, frequency dependency by the capacitance and tan δ tends to increase, while when too large, the sinterability tends to decline.

Also, when a y-value in the composition formula is too small, the sinterability tends to decline, while when too large, frequency dependency by the capacitance and tan δ tends to increase.

Furthermore, when a z-value in the composition formula is too small, frequency dependency by the capacitance and tan δ tends to increase, while when too large, the sinterability tends to decline.

Furthermore, when an m-value in the composition formula is too small, frequency dependency by the capacitance and tan δ tends to increase, while when too large, it is liable that firing at a temperature of 1300° C. or lower becomes difficult.

Preferably, with respect to 100 mol % of the main component, 0.2 to 5 mol %, and more preferably 0.2 to 3 mol % of the Mn oxide in terms of MnO, and 0.1 to 10 mol %, and more preferably 0.1 to 5 mol % of an Al oxide in terms of $Al_2O_3$ are included.

The Mn oxide is added as a reduction resistance imparting agent and a sintering auxiliary. When the adding quantity is too small, the sinterability declines, while when too large, it is liable that frequency dependency by the permittivity and a temperature coefficient of the capacitance increases and frequency dependency by the tan δ increases.

Also, when an adding quantity of the Al oxide is too small, the insulation resistance and sinterability decline, while when too much, the relative permittivity tends to decline.

Preferably, 0 to 2.5 mol % (note that 0 is excluded) and more preferably 0.5 to 2.5 mol % of a V oxide in terms of $V_2O_5$ is included with respect to 100 mol % of the main component.

By adding the V oxide, the IR accelerated lifetime can be improved. When the adding quantity is too small, it is liable that the effect of improving the IR accelerated lifetime is hard to be obtained, while when too much, sinterability tends to decline.

Preferably, the glass component contains at least $SiO_2$ as a main component.

Also, the glass component further contains BaO and CaO, and a composite oxide expressed by a general formula $(Ba, Ca)_x SiO_{2+x}$ is more preferable.

Preferably, the glass component is $[(Ba_v Ca_{1-v})O]_w SiO_2$ (barium silicate/calcium), "v" and "w" in the composition formula of the glass component are in ranges of $0 \leq v \leq 1$ and $0.5 \leq w \leq 4.0$, and the glass component is included by 0.5 to 15 mol %, more preferably 0.1 to 5 mol % with respect to 100 mol % of the main component. Further preferably, the "v" and "w" in the formula of the glass component are in ranges of $0.5 \leq v \leq 1$ and $0.55 \leq w \leq 3.0$.

When the v-value in the composition formula of the vitreous component is too small, it is liable that the IR accelerated lifetime tends to become short, while when the v-value is too large, sinterability tends to decline when the dielectric layer is made as thin as 5 μm or thinner.

The glass component is added as a sintering auxiliary. When the adding-quantity of the glass component is too small, the sinterability tends to decline, while when too much, it is liable that the sinterability is hindered.

Preferably, at least one of rare earth elements including Sc and Y is included by 0.02 to 1.5 mol % and more preferably 0.10 to 1.0 mol % with respect to 100 mol % of the main component. Note that, besides Sc and Y, the rare earth elements include 17 elements composed of a lanthanoid.

Preferably, at least one of Nb, Mo, Ta, W and Mg is included by 0.02 to 1.5 mol % and more preferably 0.10 to 1.0 mol % with respect to 100 mol % of the main component. These elements may be combined with the above rare earth elements to be included in the dielectric ceramic composition. In that case, a total content thereof is preferably 0.02 to 1.5 mol % and more preferably 0.10 to 1.0 mol % with respect to 100 mol % of the main component.

By adding oxides of these elements (including the rare earth elements), frequency dependency by a temperature coefficient of the capacitance and tan δ can be suppressed. When an adding quantity of these oxides are too small, it is liable that the effect of suppressing frequency dependency by a temperature coefficient of the capacitance and tan δ is hard to be obtained, while when too large, the sintering temperature tends to become high.

According to the present invention, there is provided a production method of any one of the dielectric ceramic compositions explained above, comprising the steps of:

preparing materials of the dielectric ceramic composition;

mixing the materials (material forms: oxides, carbon oxides, liquid-phase synthetic powder . . . etc.);

obtaining a calcinated substance by collectively calcinating the mixed materials to bring solid-phase reaction by using a dry synthesis method; and obtaining the dielectric ceramic composition by performing main firing on the calcinated substance.

Preferably, in the step of mixing the materials, high dispersion mixture is performed until an average particle diameter of the mixture composed of the main component, glass component and subcomponent becomes 1.0 μm or less.

In the method of the present invention, solid solubility of the glass component and subcomponents to the main component is uniformly accelerated, so that reactivity becomes gentle in main firing and abrupt grain growth can be suppressed. As a result, crystal particle diameters become uniform and fine and able to be sufficiently sintered at a temperature of 1300° C. or lower, so that it becomes possible to realize a thinner layer. Also, in the method of the present invention, a stress from the internal electrode is lightened when thermally contracted at the time of the main firing, so that crack defectives are reduced.

Preferably, the calcinated substance is mixed with a binder to prepare a dielectric paste, the dielectric paste is subjected to main firing, and a temperature of the main firing is 1300° C. or lower.

An average particle diameter of a crystal in the dielectric ceramic composition obtained after performing main firing on the calcinated substance is preferably 2 μm or smaller, more preferably 1.5 μm or smaller, and particularly preferably 1.0 μm or smaller.

When the average particle diameter of the crystal is too large, it is liable that the IR accelerated lifetime becomes short and reliability declines, for example, when the dielectric layer in a multilayer ceramic capacitor is made as thin as 5 μm or thinner.

The dielectric ceramic composition according to the present invention is preferably produced by the method described above.

According to the present invention, there is provided an electronic device having a dielectric layer, wherein the dielectric layer is composed of any one of the dielectric ceramic compositions explained above.

Preferably, an electronic device according to the present invention is an electronic device, such as a multilayer ceramic capacitor, having alternately stacked internal electrodes and dielectric layers.

Preferably, the internal electrode includes at least nickel or other base metal.

Preferably, an average particle diameter of a crystal in the dielectric layer is 2 μm or less.

In the production method of an electronic device according to the present invention, main firing at 1300° C. or lower is performed on the internal electrodes and dielectric layers at a time.

BRIEF DESCRIPTION OF DRAWINGS

These and other objects and features of the present invention will become clearer from the following description of the preferred embodiments given with reference to the attached drawings, in which.

DESCRIPTION OF THE PREFERRED EMBODIMENT

Figure 1:
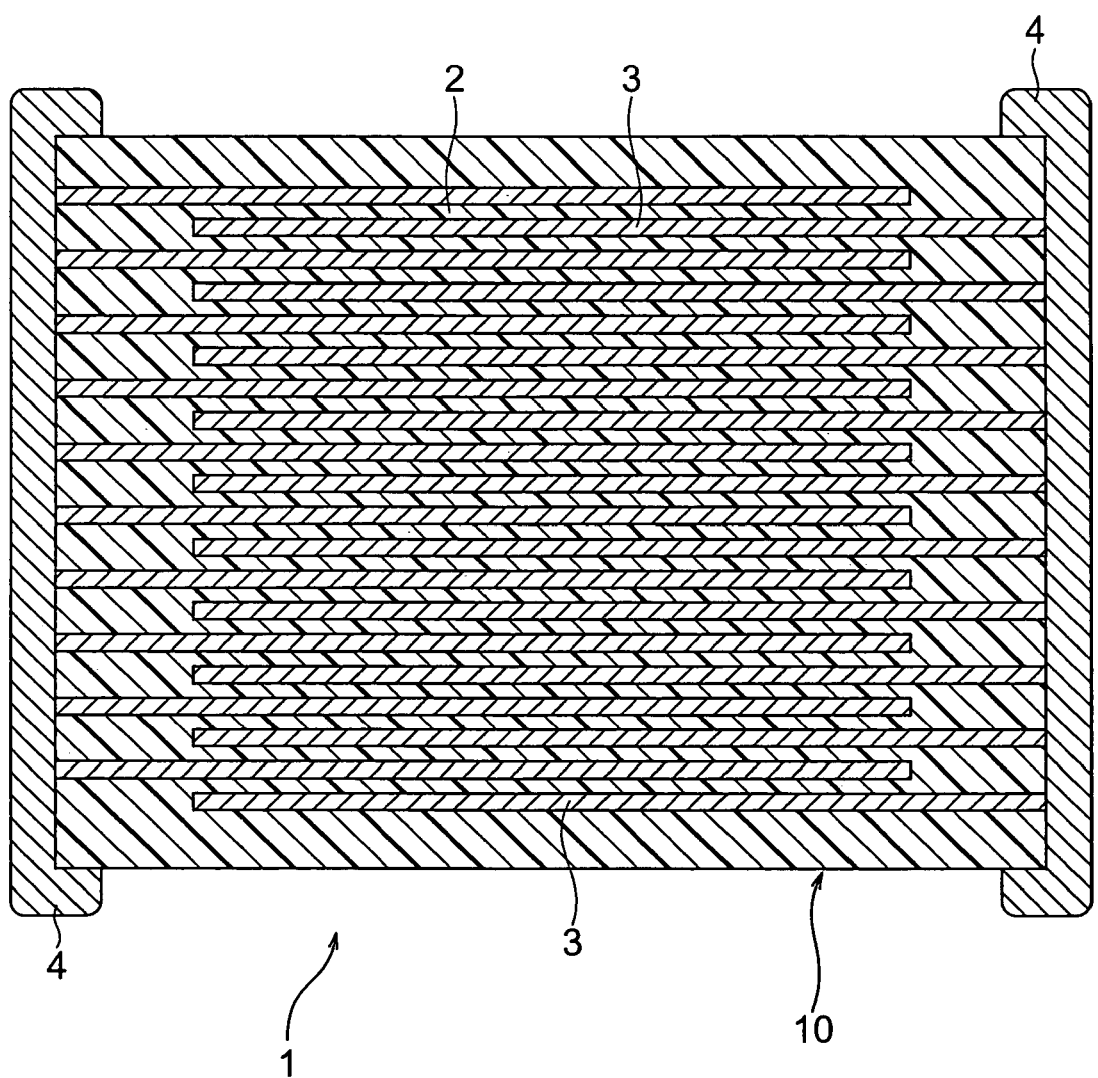
FIG. 1 is a cross-sectional view of a multilayer ceramic capacitor according to an embodiment of the present invention.

Below, the present invention will be explained in detail based on embodiments shown in the drawings.

Multilayer Ceramic Capacitor

As shown in FIG. 1, a multilayer ceramic capacitor 1 as an electronic device according to an embodiment of the present invention has a capacitor element body 10 having a configuration that dielectric layers 2 and internal electrode layers 3 are alternately stacked. On both end portions of the capacitor element body 10, a pair of external electrodes 4 respectively connected to the internal electrode layers 3 alternately arranged inside the element body 10 are formed. A shape of the capacitor element body 10 is not particularly limited, but normally is rectangular parallelepiped. Also, a size thereof is not particularly limited and may be suitable size in accordance with the use object, but normally is (0.4 to 5.6 mm)×(0.2 to 5.0 mm)×(0.2 to 1.9 mm) or so.

The internal electrode layers 3 are stacked so as to be alternately exposed to surfaces of two facing end portions of the capacitor element body 10. The pair of external electrodes 4 are formed at both end portions of the capacitor element body 10 and connected to exposed end surfaces of the alternately arranged internal electrode layers 3 so as to compose a capacitor circuit.

Dielectric Layer 2

The dielectric layer 2 includes the dielectric ceramic composition of the present invention.

A dielectric ceramic composition of the present invention includes at least a main component containing a dielectric oxide having a composition expressed by $[(Ca_xSr_{1-x})O]_m[(Ti_yZr_{1-y-z}Hf_z)O_2]$, a first subcomponent containing a Mn oxide and/or an Al oxide, and a glass component.

In the formula, "m", "x", "y" and "z" indicating composition mole ratios in the main component are in relationships below.

$0.90 \leq m \leq 1.04$, preferably $1.005 \leq m \leq 1.025$
$0.5 \leq x < 1$, preferably $0.6 \leq x \leq 0.9$
$0.01 \leq y \leq 0.10$, preferably $0.02 \leq y \leq 0.07$
$0 < z \leq 0.20$, preferably $0 < z \leq 0.10$ When the x-vale in the composition formula of the main component is too small, it is liable that frequency dependency by the capacitance and tan δ increases, while when too large, the sinterability tends to decline.

Also, when a y-value in the composition formula is too small, the sinterability tends to decline, while when too large, frequency dependency by the capacitance and tan δ tends to increase.

Furthermore, when a z-value in the composition formula is too small, frequency dependency by the capacitance and tan δ tends to increase, while when too large, the sinterability tends to decline.

Furthermore, when an m-value in the composition formula is too small, frequency dependency by the capacitance and tan δ tends to increase, while when too large, it is liable that firing at a temperature of 1300° C. or lower becomes difficult.

Preferably, with respect to 100 mol % of the main component, 0.2 to 5 mol %, and more preferably 0.2 to 3 mol % of the Mn oxide in terms of MnO, and 0.1 to 10 mol %, and more preferably 0.1 to 5 mol % of an Al oxide in terms of $Al_2O_3$ are included.

The Mn oxide is added as a reduction resistance imparting agent and a sintering auxiliary. When the adding quantity is too small, the sinterability declines, while when too large, it is liable that frequency dependency by the permittivity and a temperature coefficient of the capacitance increases and frequency dependency by the tan δ increases.

Also, when an adding quantity of the Al oxide is too small, the insulation resistance and sinterability decline, while when too much, the relative permittivity tends to decline.

Preferably, 0 to 2.5 mol % (note that 0 is excluded) and more preferably 0.5 to 2.5 mol % of a V oxide in terms of $V_2O_5$ is included with respect to 100 mol % of the main component.

By adding the V oxide, the IR accelerated lifetime can be improved. When the adding quantity is too small, it is liable that the effect of improving the IR accelerated lifetime is hard to be obtained, while when too much, sinterability tends to decline.

Preferably, the glass component contains at least $SiO_2$ as a main component.

Also, the glass component further contains BaO and CaO, and a composite oxide expressed by a general formula (Ba, Ca)$_x$SiO$_{2+x}$ is more preferable.

Preferably, the glass component is $[(Ba_vCa_{1-v})O]_w SiO_2$ (barium silicate/calcium), "v" and "w" in the composition formula of the glass component are in ranges of $0 \leq v \leq 1$ and $0.5 \leq w \leq 4.0$, and the glass component is included by 0.5 to 15 mol %, more preferably 0.1 to 5 mol % with respect to 100 mol % of the main component. Further preferably, the "v" and "w" in the formula of the glass component are in ranges of $0.5 \leq v \leq 1$ and $0.55 \leq w \leq 3.0$.

When the v-value in the composition formula of the vitreous component is too small, it is liable that the IR accelerated lifetime tends to become short, while when the v-value is too large, sinterability tends to decline when the dielectric layer is made as thin as 5 μm or thinner.

The glass component is added as a sintering auxiliary. When the adding quantity of the glass component is too small, the sinterability tends to decline, while when too much, it is liable that the sinterability is hindered.

Preferably, at least one of rare earth elements including Sc and Y is included by 0.02 to 1.5 mol % and more preferably 0.10 to 1.0 mol % with respect to 100 mol % of the main component. Note that, besides Sc and Y, the rare earth elements include 17 elements composed of a lanthanoid.

Preferably, at least one of Nb, Mo, Ta, W and Mg is included by 0.02 to 1.5 mol % and more preferably 0.10 to 1.0 mol % with respect to 100 mol % of the main component. These elements may be combined with the above rare earth elements to be included in the dielectric ceramic composition. In that case, a total content thereof is preferably 0.02 to 1.5 mol % and more preferably 0.10 to 1.0 mol % with respect to 100 mol % of the main component.

By adding oxides of these elements (including the rare earth elements), frequency dependency by a temperature coefficient of the capacitance and tan δ can be suppressed. When an adding quantity of these oxides are too small, it is liable that the effect of suppressing frequency dependency by a temperature coefficient of the capacitance and tan δ is hard to be obtained, while when too large, the sintering temperature tends to become high.

Note that the number of stacked layers and thickness of the dielectric layer 2 shown in FIG. 1 and other conditions may be suitably determined in accordance with the use object. It is preferable that the dielectric layer 2 is composed of crystal grains and a grain boundary phase, and an average particle diameter of the crystal grain of the dielectric layer 2 is 2 μm or less. The grain boundary phase normally contains oxides of materials composing the dielectric material or internal electrode material, oxides of separately added materials and, furthermore, oxides of materials to be mixed in as impurities in the procedure, and is normally composed of glass or a vitreous material.

Internal Electrode Layer 3

A conductive material included in the internal electrode layer 3 is not particularly limited, and base metals may be used because composing material of the dielectric layer 2 has reducing resistance. As the base metal to be used as the conductive material, Ni or a Ni alloy is preferable. As a Ni alloy, an alloy of one or more kinds of elements selected from Mn, Cr, Co and Al with Ni is preferable, and a content of Ni in the alloy is preferably 95 wt % or more. Note that the Ni or Ni alloy may contain various trace components, such as P, Fe and Mg, by not more than 0.1 wt % or so.

A thickness of the internal electrode layer may be suitably determined in accordance with the use object, etc., but normally it is preferably 0.5 to 5 μm, and particularly 1 to 2.5 μm or so.

External Electrode 4

A conductive material included in the external electrode 4 is not particularly limited, and Cu, a Cu alloy, Ni and Ni alloy, etc. are used. Of course, Ag and an Ag—Pd alloy, etc. may be also used. Note that inexpensive Ni, Cu and alloys of these are used in the present embodiment. A thickness of the external electrode may be suitably determined in accordance with the use object, etc., but normally 10 to 50 μm or so is preferable.

Production Method of Multilayer Ceramic Capacitor

A multilayer ceramic capacitor using the dielectric ceramic composition of the present invention is produced by forming a green chip by a normal printing method and sheet method using pastes, firing the same, then, printing or transferring external electrodes and firing in the same way as in a multilayer ceramic capacitor of the related art. Below, the production method will be explained specifically.

First, a dielectric layer paste, internal electrode paste and external electrode paste are produced, respectively.

Dielectric Layer Paste

The dielectric layer paste may be an organic paste obtained by kneading the dielectric material with an organic vehicle or a water based paste.

As the dielectric material, in accordance with a composition of the dielectric ceramic composition according to the present invention explained above, materials composing the main component and subcomponents (including a glass component) are used. Note that a form of the materials is not particularly limited and oxides composing the main component and subcomponents and/or compounds, which become oxides by firing, are used and the materials may be powder obtained by a liquid-phase synthesis method.

Note that, as compounds to become oxides by firing, for example, carbonate, oxalate, nitrate, hydroxide and organic metal compound, etc. may be mentioned. Of course, oxides and the compounds to be oxides by firing may be used together. A content of each compound in the dielectric material may be determined so as to attain the above explained composition of the dielectric ceramic composition after firing. As the material powder, those having an average particle diameter of 0.0005 to 1.5 μm or so are used in the present embodiment.

An organic vehicle is obtained by dissolving a binder in an organic solvent. The binder to be used for the organic vehicle is not particularly limited and may be suitably selected from a variety of normal binders, such as ethyl cellulose and polyvinyl butyral. Also, the organic solvent to be used here is not particularly limited and may be suitably selected from a variety of organic solvents, such as terpineol, butyl carbitol, acetone, and toluene, in accordance with a method to be used, such as the printing method and sheet method.

Also, a water based paste is obtained by dissolving a water-soluble binder and dispersant, etc. in water. The water-soluble binder is not particularly limited and may be suitably selected from polyvinyl alcohol, cellulose, water-soluble acrylic resin, and emulsion etc.

In the present embodiment, the paste is not collectively fabricated by mixing the main component (base material) and subcomponents (additives) in a vehicle by the liquid-phase method, but the solid-phase method is used. Namely, after performing high dispersion mixing on the main component materials and subcomponent materials, the result is dried, then, calcinated at a time, and the result is mixed with a vehicle to fabricate the paste.

The high dispersion mixing of the main component materials and subcomponent materials is performed, for example, by adding water as a medium respectively to the main component materials and subcomponent materials and mixing by a ball mill for 16 to 40 hours. A condition of the calcination is not particularly limited and, for example, 1100 to 1300° C. for 2 to 4 hours. The calcinated result is subjected to wet grinding by a ball mill, etc., dried, then, fabricated to be a paste.

Internal Electrode Paste and External Electrode Paste

The internal electrode layer paste is fabricated by kneading a conductive material formed by the above variety of conductive metals and alloys or a variety of oxides, organic metal compounds, and resinates, etc., which become the above conductive material after firing, with the above organic vehicle. The external electrode paste may be fabricated in the same way as in the case of the internal electrode layer paste explained above.

A content of each of the above pastes and organic vehicle is not particularly limited and may be a normal content that, for example, the binder is 1 to 5 wt % or so and the solvent is 10 to 50 wt % or so. Also, each paste may contain additives selected from a variety of dispersants, plasticizers, dielectrics, and insulator, etc. in accordance with need.

When using the printing method, the dielectric paste and the internal electrode paste are stacked by printing on a substrate of polyethylene terephhtalate, etc., cut to be a predetermined shape, then, released from the substrate to obtain a green chip. On the other hand, when using the sheet method, the dielectric paste is used for forming a green sheet, the internal electrode paste is printed thereon and, then, the results are stacked to obtain a green chip.

Next, the green chip is subjected to binder removal processing and firing.

Binder Removal Processing

The binder removal processing may be performed under a normal condition, but particularly when using a base metal, such as Ni and a Ni alloy, as a conductive material of the internal electrode layer, it is performed in the air, the temperature rising rate is 5 to 300° C./hour and preferably 10 to 100° C., the holding temperature is 180 to 400° C. and preferably 200 to 300° C., and the temperature holding time is 0.5 to 24 hours and preferably 5 to 20 hours.

Main Firing

A firing atmosphere of the green chip may be suitably determined in accordance with a kind of the conductive material in the internal electrode layer paste, but when using a base metal, such as Ni and a Ni alloy, as a conductive material, a reducing atmosphere is preferable, and the oxygen partial pressure of the firing atmosphere is preferably $10^{-10}$ to $10^{-3}$ Pa and more preferably $10^{-7}$ to $10^{-3}$ Pa ($10^{-5}$ to $10^{-12}$ atm). When the oxygen partial pressure at firing is too low, it is liable that the conductive material of the internal electrode is abnormally sintered, while when too high, the internal electrode tends to be oxidized.

The holding temperature at the main firing is 1300° C. or lower, preferably 1000 to 1300° C., and more preferably 1200 to 1300° C. When the holding temperature is too low, densification tends to become insufficient, while when too high, the capacity-temperature characteristics tend to deteriorate as a result of breakings of electrodes due to abnormal sintering of the internal electrode or dispersion of the internal electrode layer material.

As other firing conditions, the temperature rising rate is preferably 50 to 500° C./hour and more preferably 200 to 300° C./hour, the temperature holding time is preferably 0.5 to 8 hours and more preferably 1 to 3 hours, and the cooling rate is preferably 50 to 500° C./hour and more preferably 200 to 300° C./hour. Also, the firing atmosphere is preferably a reducing atmosphere and a preferable atmosphere gas is, for example, a wet mixed gas of nitrogen gas and hydrogen gas.

When firing in a reducing atmosphere, it is preferable that annealing (thermal treatment) is performed on a sintered body of the capacitor chip.

Annealing (Thermal Treatment)

Annealing is processing for re-oxidizing the dielectric layer and the insulation resistance can be improved thereby. An oxygen partial pressure in the annealing atmosphere is preferably $10^{-4}$ Pa or higher, and more preferably 1 to $10^{-3}$ Pa ($10^{-5}$ to $10^{-8}$ atm). When the oxygen partial pressure is too low, re-oxidization of the dielectric layer 2 tends to become difficult, while when too high, the internal electrode layer 3 tends to be oxidized.

The holding temperature at annealing is preferably 1150° C. or lower, and more preferably 500 to 1100° C. When the holding temperature is too low, re-oxidization of the dielectric layer becomes insufficient, so that it is liable that the insulation resistance becomes low and the accelerated lifetime becomes short. On the other hand, when the holding temperature is too high, not only the internal electrode layer is oxidized to reduce the capacity, but the internal electrode layer reacts with the dielectric base material, and it is liable that deterioration of the capacity-temperature characteristics, a decline of the insulation resistance and a decline of the accelerated lifetime are caused. Note that the annealing may be composed only of a temperature rising step and a temperature lowering step. In this case, the temperature holding time is zero and the holding temperature becomes a synonym of the highest temperature.

As other annealing conditions, the temperature holding time is preferably 0 to 20 hours and more preferably 6 to 10 hours, and the cooling rate is preferably 50 to 500° C./hour and more preferably 100 to 300° C./hour. Also, a preferable atmosphere gas to be used in the annealing is, for example, a wet nitrogen gas.

In the same way as in the firing explained above, for example, a wetter, etc. may be used to wet the nitrogen gas and mixed gas, etc. in the above binder removal processing and annealing. In this case, the water temperature is preferably 5 to 75° C.

The binder removal processing, firing and annealing may be performed continuously or separately. When performing continuously, the atmosphere is changed without cooling after the binder removal processing, continuously, the temperature is raised to the holding temperature at firing to perform firing. Next, it is cooled and the thermal treatment is preferably performed by changing the atmosphere when the temperature reaches to the holding temperature of the thermal treatment. On the other hand, when performing them separately, after raising the temperature to the holding temperature at the binder removal processing in an atmosphere of a nitrogen gas or a wet nitrogen gas, the atmosphere is changed, and the temperature is furthermore raised. After that, after cooling the temperature to the holding temperature at the annealing, it is preferable that the cooling continues by changing the atmosphere again to a nitrogen gas or a wet nitrogen gas. Also, in the annealing, after raising the temperature to the holding temperature under the nitrogen gas atmosphere, the atmosphere may be changed, or the entire process of the annealing may be in a wet nitrogen gas atmosphere.

The thus obtained capacitor sintered body is subjected to end surface polishing, for example, by barrel polishing and sand-blast, etc., then, a terminal electrode paste is printed or transferred, and firing is performed to external electrodes 4.

A firing condition of the external electrode paste is preferably at 600 to 800° C. for 10 minutes to 1 hour or so in a wet mixed gas of nitrogen gas and hydrogen gas. In accordance with need, soldering, etc. is performed on the external electrode 4 to form a cover layer (pad layer).

The ceramic capacitor 1 of the present embodiment produced as above is mounted on a print substrate, etc. by soldering, etc. and used for a variety of electronic equipments.

Note that the present invention is not limited to the above embodiments and may be variously modified within the scope of the present invention.

For example, in the above embodiment, a multilayer ceramic capacitor was explained as an example of an electronic device according to the present invention, but an electronic device according to the present invention is not limited to the multilayer ceramic capacitor and may be any as far as it is composed of a dielectric ceramic composition having the above composition.

Next, the present invention will be explained further in detail by taking more specific examples of the embodiment of the present invention, but the present invention is not limited to the examples.

EXAMPLE 1

First, as starting materials for producing a dielectric material, main component materials ($SrCO_3$, $CaCO_3$, $TiO_2$, $ZrO_2$ and $HfO_2$) and subcomponent materials (including a glass component) each having an average particle diameter of 0.1 to 1.5 μm were prepared. As the subcomponent materials, carbonate ($MnO_3$ and $BaCO_3$) or oxides ($Al_2O_3$, $SiO_2$ and $Y_2O_3$, etc.) were used.

After weighing the materials, so that a composition after firing would be the composition shown in Table 1 below, water as a medium was added to the materials and mixed by a ball mill for 16 to 40 hours to perform high dispersion mixing. After that, the mixture was dried, then, calcinated under a condition of 1100 to 1300° C. for 2 to 4 hours. Thus obtained calcinated substance was subjected to wet grinding by a ball mill and dried.

With 100 parts by weight of the thus obtained dried dielectric material, 4.8 parts by weight of an acrylic resin, 40 parts by weight of methylene chloride, 20 parts by weight of ethyl acetate, 6 parts by weight of mineral spirit, and 4 parts by weight of acetone were mixed by a ball mill to form a paste, so that a dielectric layer paste was obtained.

Next, 100 parts by weight of Ni particles, 40 parts by weight of an organic vehicle (obtained by dissolving 8 parts by weight of ethyl cellulose in 92 parts by weight of butyl carbitol) and 10 parts by weight of butyl carbitol were kneaded by three-roll to form a paste, so that an internal electrode layer paste was obtained.

Next, 100 parts by weight of Cu particles, 35 parts by weight of an organic vehicle (obtained by dissolving 8 parts by weight of an ethyl cellulose resin in 92 parts by weight of butyl carbitol) and 7 parts by weight of butyl carbitol were kneaded by three-roll to form a paste, so that an external electrode paste was obtained.

Next, by using the dielectric layer paste, a green sheet having a thickness of 7 μm was formed on a PET film, after printing the internal electrode layer paste thereon, the green sheet was removed from the PET film. Next, the green sheets and protective green sheets (not printed with the internal electrode layer paste) were stacked and bonded with pressure, so that a green chip was obtained. The number of the stacked sheets having an internal electrode was four.

Next, the green chip was cut to a predetermined size and subjected to binder removal processing, firing and annealing (thermal treatment), so that a multilayer ceramic fired body was obtained. The binder removal processing was performed under a condition of the temperature raising rate of 15° C./hour, the holding temperature of 280° C., the temperature holding time of 8 hours, and the atmosphere of in the air. The firing was performed under a condition of the temperature raising rate of 200° C./hour, the holding temperature of 1280° C., the temperature holding time of 2 hours, cooling rate of 300° C./hour and the atmosphere of wet mixed gas of $N_2$ and $H_2$ (the oxygen partial pressure was adjusted to be in a range of $2\times10^{-7}$ to $5\times10^{-3}$ Pa). The annealing was performed under a condition of the holding temperature of 900° C., the temperature holding time of 9 hours, cooling rate of 300° C./hour and the atmosphere of wet $N_2$ gas (the oxygen partial pressure was $3.54\times10^{-2}$ Pa). Note that a wetter, wherein the water temperature was 35° C., was used to wet the atmosphere gas at the time of firing and annealing.

Next, after polishing end surfaces of the obtained multilayer ceramic fired body by sand blasting, the external electrode paste was transferred to the end surfaces and fired at 800° C. for 10 minutes in a wet $N_2$+$H_2$ atmosphere to form external electrodes, so that samples of the multilayer ceramic capacitor having the configuration as shown in FIG. 1 were obtained.

A size of the thus obtained samples was 3.2 mm×1.6 mm×0.6 mm, the number of dielectric layers sandwiched by internal electrode layers was 4, a thickness of one dielectric layer was 7 μm, and a thickness of one internal electrode layer was 2 μm. Evaluation of the characteristics below was made on the respective samples.

Specific Permittivity ($\epsilon_r$) and Insulation Resistance (IR)

A capacitance of the capacitor samples was measured under a condition of the reference temperature of 25° C., a frequency of 1 kHz, and an input signal level (measurement voltage) of 1 Vrms by using a digital LCR meter (4274A made by YHP). Then, the obtained capacitance, and an electrode size and a distance between electrodes in each capacitor sample were used for calculating the specific permittivity (no unit).

After that, by using an insulation resistance tester (R8340A made by Advantest Corporation), insulation resistance IR after applying a direct current of 50V to the capacitor samples for 60 seconds at 25° C. was measured. The results are shown in Table 2.

Temperature Characteristic of Capacitance

A capacitance at a frequency of 1 kHz and a voltage of 1V was measured on the capacitor samples by using an LCR meter in a temperature range of 25 to 125° C. when assuming that the reference temperature was 20° C. to check whether the change rate of the capacitance with respect to the temperature satisfied −150 to +150 ppm/° C. The results are shown in Table 2.

The capacitance change rate $\Delta C125/C25$(ppm/° C.) was calculated by the formula 1 below.

$$\Delta C125/C25=\{(C125-C25)/C25\}\times(1/(125-25)) \quad (1)$$

Note that "C125" indicates a capacitance at 125° C. and "C25" indicates a capacitance at 25° C. in the formula.

High Temperature Load Lifetime (Accelerated Lifetime of Insulation Resistance)

The capacitor samples were kept in a state of being applied with a direct current voltage of 70 V/μm at 200° C.

for measuring time until the resistance (IR) became $2\times10^5\Omega$ by considering it as a high temperature load lifetime. The measurement of the high temperature load lifetime was made on 10 capacitor samples and the evaluation was made by obtaining the average lifetime. The results are shown in Table 2.

Crystal Average Particle Diameter

Figure 2B:
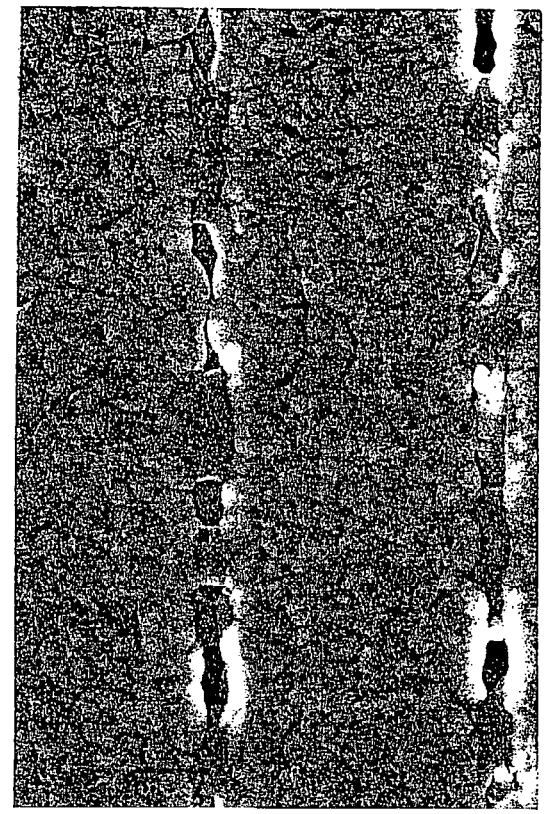
FIG. 2B is an enlarged picture of a key part of a capacitor using a dielectric ceramic composition, wherein Hf is added.
Figure 2A:
FIG. 2A is an enlarged picture of a key part of a capacitor using a dielectric ceramic composition, wherein Hf is not added.

By cutting the capacitor samples and taking an enlarged picture of a section of each capacitor sample, an average particle diameter of crystal grains composing the dielectric layer was obtained. The results are shown in Table 2. Note that an enlarged picture of a section of a capacitor sample as an example corresponding to a sample No. 3 shown in Table 1 and Table 2 is shown in FIG. 2B, and that as a comparative example corresponding to a sample No. 10 is shown in FIG. 2A.

Insulation Resistance Defect Rate

Insulation resistance was measured on 1000 capacitor samples having the same composition by the same method of measuring insulation resistance explained above. Those exhibited $10^{10}$ Ω or lower were considered defective and percentage of the defective samples was obtained.

TABLE 1

| Sample No. | Main Component Mole Ratios in $[(Ca_xSr_{1-x})O]_m[(Ti_yZr_{1-y-z}Hf_z)O_2]$ | | | | | | Subcomponent 1 mol % with respect to 100 mol of Main Component | | Glass Component $[(Ba_vCa_{1-v})O]_wSiO_2$ Mole Ratios | | | Adding Quantity mol % | Subcomponent 2 mol % with respect to 100 mol of Main Component | |
|---|---|---|---|---|---|---|---|---|---|---|---|---|---|---|
| | x | 1 − x | y | 1 − y − z | z | m | MnO | Al2O3 | v | 1 − v | w | | Additive | Adding Quantity |
| ※1 | 0.4 | 0.6 | 0.05 | 0.9 | 0.05 | 1 | 1 | 0.5 | 0.5 | 0.5 | 1 | 3 | — | — |
| 2 | 0.5 | 0.5 | 0.05 | 0.9 | 0.05 | 1 | 1 | 0.5 | 0.5 | 0.5 | 1 | 3 | — | — |
| 3 | 0.7 | 0.3 | 0.05 | 0.9 | 0.05 | 1 | 1 | 0.5 | 0.5 | 0.5 | 1 | 3 | — | — |
| 4 | 0.9 | 0.1 | 0.05 | 0.9 | 0.05 | 1 | 1 | 0.5 | 0.5 | 0.5 | 1 | 3 | — | — |
| ※5 | 1.0 | 0.0 | 0.05 | 0.9 | 0.05 | 1 | 1 | 0.5 | 0.5 | 0.5 | 1 | 3 | — | — |
| ※6 | 0.7 | 0.3 | 0 | 0.95 | 0.05 | 1 | 1 | 0.5 | 0.5 | 0.5 | 1 | 3 | — | — |
| 7 | 0.7 | 0.3 | 0.01 | 0.94 | 0.05 | 1 | 1 | 0.5 | 0.5 | 0.5 | 1 | 3 | — | — |
| 8 | 0.7 | 0.3 | 0.1 | 0.85 | 0.05 | 1 | 1 | 0.5 | 0.5 | 0.5 | 1 | 3 | — | — |
| ※9 | 0.7 | 0.3 | 0.11 | 0.84 | 0.05 | 1 | 1 | 0.5 | 0.5 | 0.5 | 1 | 3 | — | — |
| ※10 | 0.7 | 0.3 | 0.05 | 0.95 | 0.00 | 1 | 1 | 0.5 | 0.5 | 0.5 | 1 | 3 | — | — |
| 11 | 0.7 | 0.3 | 0.05 | 0.94 | 0.01 | 1 | 1 | 0.5 | 0.5 | 0.5 | 1 | 3 | — | — |
| 12 | 0.7 | 0.3 | 0.05 | 0.75 | 0.20 | 1 | 1 | 0.5 | 0.5 | 0.5 | 1 | 3 | — | — |
| ※13 | 0.7 | 0.3 | 0.05 | 0.73 | 0.22 | 1 | 1 | 0.5 | 0.5 | 0.5 | 1 | 3 | — | — |
| ※14 | 0.7 | 0.3 | 0.05 | 0.9 | 0.05 | 0.8 | 1 | 0.5 | 0.5 | 0.5 | 1 | 3 | — | — |
| 15 | 0.7 | 0.3 | 0.05 | 0.9 | 0.05 | 0.9 | 1 | 0.5 | 0.5 | 0.5 | 1 | 3 | — | — |
| 16 | 0.7 | 0.3 | 0.05 | 0.9 | 0.05 | 1.04 | 1 | 0.5 | 0.5 | 0.5 | 1 | 3 | — | — |
| ※17 | 0.7 | 0.3 | 0.05 | 0.9 | 0.05 | 1.05 | 1 | 0.5 | 0.5 | 0.5 | 1 | 3 | — | — |
| ※18 | 0.7 | 0.3 | 0.05 | 0.9 | 0.05 | 1 | 0.1 | 0.5 | 0.5 | 0.5 | 1 | 3 | — | — |
| 19 | 0.7 | 0.3 | 0.05 | 0.9 | 0.05 | 1 | 0.2 | 0.5 | 0.5 | 0.5 | 1 | 3 | — | — |
| 20 | 0.7 | 0.3 | 0.05 | 0.9 | 0.05 | 1 | 5 | 0.5 | 0.5 | 0.5 | 1 | 3 | — | — |
| ※21 | 0.7 | 0.3 | 0.05 | 0.9 | 0.05 | 1 | 6 | 0.5 | 0.5 | 0.5 | 1 | 3 | — | — |
| ※22 | 0.7 | 0.3 | 0.05 | 0.9 | 0.05 | 1 | 1 | 0.05 | 0.5 | 0.5 | 1 | 3 | — | — |
| 23 | 0.7 | 0.3 | 0.05 | 0.9 | 0.05 | 1 | 1 | 0.1 | 0.5 | 0.5 | 1 | 3 | — | — |
| 24 | 0.7 | 0.3 | 0.05 | 0.9 | 0.05 | 1 | 1 | 10 | 0.5 | 0.5 | 1 | 3 | — | — |
| ※25 | 0.7 | 0.3 | 0.05 | 0.9 | 0.05 | 1 | 1 | 11 | 0.5 | 0.5 | 1 | 3 | — | — |

TABLE 2

| | Electric Characteristics | | | | | |
|---|---|---|---|---|---|---|
| Sample No. | Permittivity ε | Insulation Resistance IR (Ω) | Capacity Change Rate ΔC/C(ppm/° C.) | Accelerated Lifetime (h) | Crystal Average Particle Diameter (μm) | note) Insulation Resistance Defect Rate (%) |
| ※1 | 33 | $2 \times 10^{13}$ | +45 | 250 | 1.7 | 0.0 |
| 2 | 35 | $9 \times 10^{13}$ | +3 | 260 | 1.5 | 0.0 |
| 3 | 38 | $9 \times 10^{13}$ | +3 | 280 | 1.5 | 0.0 |
| 4 | 36 | $9 \times 10^{13}$ | +6 | 265 | 1.5 | 0.0 |
| ※5 | 14 | $2 \times 10^9$ | +3 | 20 | 0.9 | — |
| ※6 | 16 | $3 \times 10^9$ | +3 | 19 | 0.9 | — |
| 7 | 35 | $3 \times 10^{13}$ | +8 | 275 | 1.4 | 0.0 |
| 8 | 36 | $5 \times 10^{13}$ | +10 | 270 | 1.6 | 0.0 |
| ※9 | 40 | $3 \times 10^{13}$ | +44 | 250 | 0.9 | 0.0 |
| ※10 | 35 | $3 \times 10^{13}$ | +41 | 30 | 0.9 | 2.0 |
| 11 | 36 | $9 \times 10^{13}$ | +5 | 265 | 1.4 | 0.0 |
| 12 | 36 | $6 \times 10^{13}$ | +7 | 270 | 1.5 | 0.0 |
| ※13 | 15 | $2 \times 10^9$ | +3 | 25 | 0.9 | — |
| ※14 | 39 | $3 \times 10^{13}$ | +50 | 235 | 1 | 0.0 |
| 15 | 38 | $9 \times 10^{13}$ | +5 | 270 | 1.4 | 0.0 |
| 16 | 35 | $9 \times 10^{13}$ | +5 | 265 | 1.5 | 0.0 |

TABLE 2-continued

| | | | Electric Characteristics | | | |
|---|---|---|---|---|---|---|
| Sample No. | Permittivity ε | Insulation Resistance IR (Ω) | Capacity Change Rate ΔC/C(ppm/°C.) | Accelerated Lifetime (h) | Crystal Average Particle Diameter (μm) | note) Insulation Resistance Defect Rate (%) |
| X17 | 15 | $5 \times 10^9$ | +3 | 25 | 0.9 | — |
| X18 | 33 | $7 \times 10^9$ | +9 | 10 | 1.3 | — |
| 19 | 38 | $9 \times 10^{13}$ | +5 | 280 | 1.6 | 0.0 |
| 20 | 36 | $5 \times 10^{13}$ | +5 | 280 | 1.6 | 0.0 |
| X21 | 36 | $8 \times 10^{13}$ | +50 | 20 | 1.5 | 0.0 |
| X22 | 33 | $9 \times 10^9$ | +9 | 10 | 1.3 | — |
| 23 | 37 | $9 \times 10^{13}$ | +3 | 270 | 1.5 | 0.0 |
| 24 | 38 | $8 \times 10^{13}$ | +9 | 270 | 1.4 | 0.0 |
| X25 | 20 | $8 \times 10^{13}$ | +4 | 260 | 0.9 | 0.0 |

X out of range
note) Those with $10^{10}$ or lower are considered defective in n = 1000 in the insulation resistance defect rate.

Note that, in Table 1 and Table 2, those added with "*" to their sample numbers are samples being out of the preferable composition range of the present invention. It will be the same also in other tables.

Evaluation 1

As shown in Table 1 and Table 2, by comparing the sample numbers 1 to 5, it was confirmed that when $0.5 \leq x < 1$ and preferably $0.6 \leq x \leq 0.9$ was satisfied in the main component including a dielectric oxide having a composition expressed by $[(Ca_xSr_{1-x})O]_m[(Ti_yZr_{1-y-z}Hf_z)O_2]$, the permittivity and insulation resistance were high, the capacity change rate was small, the accelerated lifetime was long, the average particle diameter of the crystal was small and the insulation resistance defect rate was low.

Also, as shown in Table 1 and Table 2, by comparing the sample numbers 6 to 9, it was confirmed that when $0.01 \leq y \leq 0.10$ and preferably $0.02 \leq y \leq 0.07$ was satisfied in the main component including a dielectric oxide having a composition expressed by $[(Ca_xSr_{1-x})O]_m[(Ti_yZr_{1-y-z}Hf_z)O_2]$, the permittivity and insulation resistance were high, the capacity change rate was small, the accelerated lifetime was long, and the insulation resistance defect rate was low.

Also, as shown in Table 1 and Table 2, by comparing the sample numbers 10 to 13, it was confirmed that when $0 < z \leq 0.20$ and preferably $0 < z \leq 0.10$ was satisfied in the main component including a dielectric oxide having a composition expressed by $[(Ca_xSr_{1-x})O]_m[(Ti_yZr_{1-y-z}Hf_z)O_2]$, the permittivity and insulation resistance were high, the capacity change rate was small, the accelerated lifetime was long, and the insulation resistance defect rate was low.

Also, as shown in Table 1 and Table 2, by comparing the sample numbers 14 to 17, it was confirmed that when $0.90 \leq m \leq 1.04$ was satisfied in the main component including a dielectric oxide having a composition expressed by $[(Ca_xSr_{1-x})O]_m[(Ti_yZr_{1-y-z}Hf_z)O_2]$, the permittivity and insulation resistance were high, the capacity change rate was small, the accelerated lifetime was long, and the insulation resistance defect rate was low.

Also, as shown in Table 1 and Table 2, by comparing the sample numbers 18 to 21, it was confirmed that when a Mn oxide in terms of MnO was included by 0.2 to 5 mol % and preferably 0.2 to 3 mol % with respect to 100 mol % of the main component, the permittivity and insulation resistance were high, the capacity change rate was small, the accelerated lifetime was long, and the insulation resistance defect rate was low.

Also, as shown in Table 1 and Table 2, by comparing the sample numbers 22 to 25, it was confirmed that when an Al oxide in terms of $Al_2O_3$ was included by 0.1 to 10 mol % and preferably 0.1 to 5 mol % with respect to 100 mol % of the main component, the permittivity and insulation resistance were high, the capacity change rate was small, the accelerated lifetime was long, and the insulation resistance defect rate was low.

Furthermore, as is known by comparing FIG. 2B showing an enlarged picture of a section of a capacitor sample as an example corresponding to the sample number 3 and FIG. 2A showing an enlarged picture of a section of a capacitor sample as a comparative example corresponding to the sample number 10 shown in Table 1 and Table 2, it was confirmed that the average crystal particle diameter became small by adding Hf in the main component.

Figure 3:
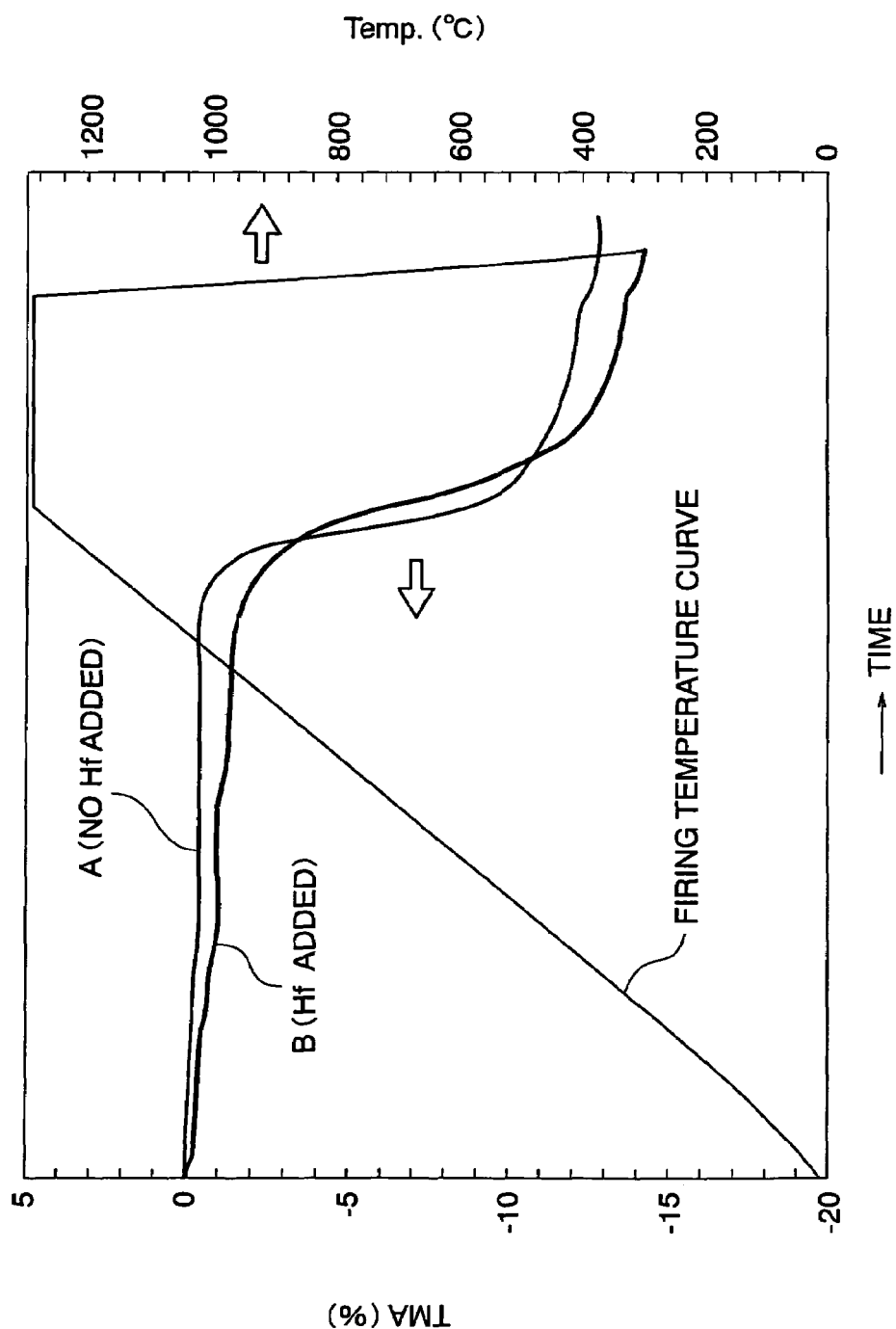
FIG. 3 is a graph of thermal shrinkage ratio (TMA) curves at the main firing of a dielectric ceramic composition, wherein Hf is not added, and that with Hf.

Also, by comparing a curve B of the shrinkage (TMA) curve at sintering shown in FIG. 3 of the capacitor sample as an example corresponding to the sample number 3 with a curve A of the TMTA curve at sintering shown in FIG. 3 of the capacitor sample as a comparative example corresponding to the sample number 10 shown in Table 1 and Table 2, the fact below was also proved. Namely, by adding Hf in the main component, the shrinkage curve at sintering becomes gentle comparing with that of a composition without Hf, and cracks and delamination are hard to be caused at cofiring with internal electrodes. Also, by adding Hf to the main component, crystal grain growth can be suppressed and a finer and uniform crystal can be realized comparing with that in the case of a composition without Hf. This also agrees with the results shown in FIG. 2.

As a result, according to the present invention, it is considered that unevenness of insulation resistance caused by unevenness of a boundary face due to cracks, delamination or uneven crystal can be suppressed. This is also obvious from the results shown in Table 1 and Table 2.

EXAMPLE 2

Other than weighing the materials, so that a composition after firing would be the composition shown in Table 3 below, capacitor samples were produced in the same way as in the example 1 and the same evaluation was made as that in the example 1. The results are shown in Table 4.

TABLE 3

| Sample No. | Main Component Mole Ratios in $[(Ca_xSr_{1-x})O]_m[(Ti_yZr_{1-y-z}Hf_z)O_2]$ | | | | | Subcomponent 1 mol % with respect to 100 mol of Main Component | | Glass Component $[(Ba_vCa_{1-v})O]_wSiO_2$ Mole Ratios | | | Adding Quantity | Subcomponent 2 mol % with respect to 100 mol of Main Component | |
|---|---|---|---|---|---|---|---|---|---|---|---|---|---|
| | x | 1 − x | y | 1 − y − z | z | m | MnO | Al2O3 | v | 1 − v | w | mol % | Additive | Adding Quantity |
| 26 | 0.7 | 0.3 | 0.05 | 0.9 | 0.05 | 1 | 1 | 0.5 | 0 | 1 | 1 | 3 | — | — |
| 27 | 0.7 | 0.3 | 0.05 | 0.9 | 0.05 | 1 | 1 | 0.5 | 0.1 | 0.9 | 1 | 3 | — | — |
| 28 | 0.7 | 0.3 | 0.05 | 0.9 | 0.05 | 1 | 1 | 0.5 | 1 | 0 | 1 | 3 | — | — |
| ✗29 | 0.7 | 0.3 | 0.05 | 0.9 | 0.05 | 1 | 1 | 0.5 | 0.5 | 0.5 | 0.4 | 3 | — | — |
| 30 | 0.7 | 0.3 | 0.05 | 0.9 | 0.05 | 1 | 1 | 0.5 | 0.5 | 0.5 | 0.5 | 3 | — | — |
| 31 | 0.7 | 0.3 | 0.05 | 0.9 | 0.05 | 1 | 1 | 0.5 | 0.5 | 0.5 | 4 | 3 | — | — |
| ✗32 | 0.7 | 0.3 | 0.05 | 0.9 | 0.05 | 1 | 1 | 0.5 | 0.5 | 0.5 | 4.1 | 3 | — | — |
| ✗33 | 0.7 | 0.3 | 0.05 | 0.9 | 0.05 | 1 | 1 | 0.5 | 0.5 | 0.5 | 1 | 0.4 | — | — |
| 34 | 0.7 | 0.3 | 0.05 | 0.9 | 0.05 | 1 | 1 | 0.5 | 0.5 | 0.5 | 1 | 0.5 | — | — |
| 35 | 0.7 | 0.3 | 0.05 | 0.9 | 0.05 | 1 | 1 | 0.5 | 0.5 | 0.5 | 1 | 15 | — | — |
| ✗36 | 0.7 | 0.3 | 0.05 | 0.9 | 0.05 | 1 | 1 | 0.5 | 0.5 | 0.5 | 1 | 16 | — | — |

TABLE 4

| | Electric Characteristics | | | | | |
|---|---|---|---|---|---|---|
| Sample No. | Permittivity ε | Insulation Resistance IR (Ω) | Capacity Change Rate ΔC/C (ppm/° C.) | Accelerated Lifetime (h) | Crystal Average Particle Diameter (μm) | note) Insulation Resistance Defect Rate (%) |
| 26 | 37 | $9 \times 10^{13}$ | +3 | 200 | 1.9 | 0.0 |
| 27 | 37 | $6 \times 10^{13}$ | +5 | 250 | 1.7 | 0.0 |
| 28 | 37 | $5 \times 10^{13}$ | +5 | 250 | 1.5 | 0.0 |
| ✗29 | 15 | $6 \times 10^{9}$ | +3 | 30 | 0.9 | — |
| 30 | 35 | $7 \times 10^{13}$ | +7 | 245 | 1.6 | 0.0 |
| 31 | 33 | $2 \times 10^{13}$ | +7 | 230 | 1.6 | 0.0 |
| ✗32 | 21 | $6 \times 10^{9}$ | +12 | 25 | 0.9 | — |
| ✗33 | 10 | $1 \times 10^{9}$ | +3 | 10 | 0.8 | — |
| 34 | 35 | $2 \times 10^{13}$ | +10 | 240 | 1 | 0.0 |
| 35 | 37 | $5 \times 10^{13}$ | +10 | 275 | 1.5 | 0.0 |
| ✗36 | 18 | $5 \times 10^{9}$ | +3 | 10 | 2 | — |

Evaluation 2

As shown in Table 3 and Table 4, by comparing the sample numbers 26 to 28, it was confirmed that when a range of $0 \leq v \leq 1$ was satisfied in $[(Ba_vCa_{1-v})O]_wSiO_2$ as a preferable glass component to be added to the main component, the permittivity and insulation resistance were high, the capacity change rate was small, the accelerated lifetime was long and the insulation resistance defect rate was low.

Also, as shown in Table 3 and Table 4, by comparing the sample numbers 29 to 32, it was confirmed that when a range of $0.5 \leq w \leq 4.0$ was satisfied in $[(Ba_vCa_{1-v})O]_wSiO_2$ as a preferable glass component to be added to the main component, the permittivity and insulation resistance were high, the capacity change rate was small, the accelerated lifetime was long and the insulation resistance defect rate was low.

Also, as shown in Table 3 and Table 4, by comparing the sample numbers 33 to 36, it was confirmed that when 0.5 to 15 mol % of a glass component was included with respect to 100 mol % of the main component, the permittivity and insulation resistance were high, the capacity change rate was small, the accelerated lifetime was long and the insulation resistance defect rate was low.

EXAMPLE 3

Other than weighing the materials, so that a composition after firing would be the composition shown in Table 5 below, capacitor samples were produced in the same way as in the example 1, and the same evaluation was made as that in the example 1. The results are shown in Table 6.

TABLE 5

| Sample No. | Main Component Mole Ratios in $[(Ca_xSr_{1-x})O]_m[(Ti_yZr_{1-y-z}Hf_z)O_2]$ | | | | | | Subcomponent 1 mol % with respect to 100 mol of Main Component | | Glass Component $[(Ba_vCa_{1-v})O]_wSiO_2$ Mole Ratios | | | Adding Quantity mol % | Subcomponent 2 mol % with respect to 100 mol of Main Component | |
|---|---|---|---|---|---|---|---|---|---|---|---|---|---|---|
| | x | 1 − x | y | 1 − y − z | z | m | MnO | Al2O3 | v | 1 − v | w | | Additive | Adding Quantity |
| ✗37 | 0.7 | 0.3 | 0.05 | 0.9 | 0.05 | 1 | 1 | 0.5 | 0.5 | 0.4 | 1 | 3 | Mg | 0.01 |
| 38 | 0.7 | 0.3 | 0.05 | 0.9 | 0.05 | 1 | 1 | 0.5 | 0.5 | 0.4 | 1 | 3 | Mg | 0.02 |

TABLE 5-continued

| | Main Component Mole Ratios in [(Ca$x$Sr1−$x$)O]m[(Ti$y$Zr1−$y$−$z$Hf$z$)O2] | | | | | Subcomponent 1 mol % with respect to 100 mol of Main Component | | Glass Component [(Ba$v$Ca1−$v$)O]$w$SiO2 Mole Ratios | | | Adding Quantity | Subcomponent 2 mol % with respect to 100 mol of Main Component | |
|---|---|---|---|---|---|---|---|---|---|---|---|---|---|
| Sample No. | x | 1 − x | y | 1 − y − z | z | m | MnO | Al2O3 | v | 1 − v | w | mol % | Additive | Adding Quantity |
| 39 | 0.7 | 0.3 | 0.05 | 0.9 | 0.05 | 1 | 1 | 0.5 | 0.5 | 0.4 | 1 | 3 | Mg | 0.5 |
| 40 | 0.7 | 0.3 | 0.05 | 0.9 | 0.05 | 1 | 1 | 0.5 | 0.5 | 0.4 | 1 | 3 | Mg | 1.5 |
| X41 | 0.7 | 0.3 | 0.05 | 0.9 | 0.05 | 1 | 1 | 0.5 | 0.5 | 0.4 | 1 | 3 | Mg | 2 |
| 42 | 0.7 | 0.3 | 0.05 | 0.9 | 0.05 | 1 | 1 | 0.5 | 0.5 | 0.4 | 1 | 3 | Sc | 0.5 |
| 43 | 0.7 | 0.3 | 0.05 | 0.9 | 0.05 | 1 | 1 | 0.5 | 0.5 | 0.4 | 1 | 3 | Y | 0.5 |
| 44 | 0.7 | 0.3 | 0.05 | 0.9 | 0.05 | 1 | 1 | 0.5 | 0.5 | 0.4 | 1 | 3 | La | 0.5 |
| 45 | 0.7 | 0.3 | 0.05 | 0.9 | 0.05 | 1 | 1 | 0.5 | 0.5 | 0.4 | 1 | 3 | Ce | 0.5 |
| 46 | 0.7 | 0.3 | 0.05 | 0.9 | 0.05 | 1 | 1 | 0.5 | 0.5 | 0.4 | 1 | 3 | Pr | 0.5 |
| 47 | 0.7 | 0.3 | 0.05 | 0.9 | 0.05 | 1 | 1 | 0.5 | 0.5 | 0.4 | 1 | 3 | Nd | 0.5 |
| 48 | 0.7 | 0.3 | 0.05 | 0.9 | 0.05 | 1 | 1 | 0.5 | 0.5 | 0.4 | 1 | 3 | Sm | 0.5 |
| 49 | 0.7 | 0.3 | 0.05 | 0.9 | 0.05 | 1 | 1 | 0.5 | 0.5 | 0.4 | 1 | 3 | Eu | 0.5 |
| 50 | 0.7 | 0.3 | 0.05 | 0.9 | 0.05 | 1 | 1 | 0.5 | 0.5 | 0.4 | 1 | 3 | Gd | 0.5 |
| 51 | 0.7 | 0.3 | 0.05 | 0.9 | 0.05 | 1 | 1 | 0.5 | 0.5 | 0.4 | 1 | 3 | Tb | 0.5 |
| 52 | 0.7 | 0.3 | 0.05 | 0.9 | 0.05 | 1 | 1 | 0.5 | 0.5 | 0.4 | 1 | 3 | Dy | 0.5 |
| 53 | 0.7 | 0.3 | 0.05 | 0.9 | 0.05 | 1 | 1 | 0.5 | 0.5 | 0.4 | 1 | 3 | Ho | 0.5 |
| 54 | 0.7 | 0.3 | 0.05 | 0.9 | 0.05 | 1 | 1 | 0.5 | 0.5 | 0.4 | 1 | 3 | Er | 0.5 |
| 55 | 0.7 | 0.3 | 0.05 | 0.9 | 0.05 | 1 | 1 | 0.5 | 0.5 | 0.4 | 1 | 3 | Tm | 0.5 |
| 56 | 0.7 | 0.3 | 0.05 | 0.9 | 0.05 | 1 | 1 | 0.5 | 0.5 | 0.4 | 1 | 3 | Yb | 0.5 |
| 57 | 0.7 | 0.3 | 0.05 | 0.9 | 0.05 | 1 | 1 | 0.5 | 0.5 | 0.4 | 1 | 3 | Lu | 0.5 |
| 58 | 0.7 | 0.3 | 0.05 | 0.9 | 0.05 | 1 | 1 | 0.5 | 0.5 | 0.4 | 1 | 3 | Nb | 0.5 |
| 59 | 0.7 | 0.3 | 0.05 | 0.9 | 0.05 | 1 | 1 | 0.5 | 0.5 | 0.4 | 1 | 3 | Mo | 0.5 |
| 60 | 0.7 | 0.3 | 0.05 | 0.9 | 0.05 | 1 | 1 | 0.5 | 0.5 | 0.4 | 1 | 3 | Ta | 0.5 |
| 61 | 0.7 | 0.3 | 0.05 | 0.9 | 0.05 | 1 | 1 | 0.5 | 0.5 | 0.4 | 1 | 3 | W | 0.5 |

X: out of range

TABLE 6

| | Electric Characteristics | | | | | |
|---|---|---|---|---|---|---|
| Sample No. | Permittivity $\epsilon$ | Insulation Resistance IR ($\Omega$) | Capacity Change Rate $\Delta C/C$(ppm/° C.) | Accelerated Lifetime (h) | Crystal Average Particle Diameter ($\mu$m) | note) Insulation Resistance Defect Rate (%) |
| X37 | 18 | 4 × 10$^9$ | +3 | 10 | 0.8 | — |
| 38 | 33 | 2 × 10$^{13}$ | +10 | 220 | 0.9 | 0.0 |
| 39 | 38 | 9 × 10$^{13}$ | +3 | 280 | 1.5 | 0.0 |
| 40 | 38 | 9 × 10$^{13}$ | +3 | 230 | 0.9 | 0.0 |
| X41 | 38 | 9 × 10$^{13}$ | +45 | 240 | 1.5 | 0.0 |
| 42 | 38 | 9 × 10$^{13}$ | +3 | 280 | 1.5 | 0.0 |
| 43 | 38 | 9 × 10$^{13}$ | +3 | 280 | 1.5 | 0.0 |
| 44 | 38 | 9 × 10$^{13}$ | +3 | 280 | 1.5 | 0.0 |
| 45 | 38 | 9 × 10$^{13}$ | +3 | 280 | 1.5 | 0.0 |
| 46 | 38 | 9 × 10$^{13}$ | +3 | 280 | 1.5 | 0.0 |
| 47 | 38 | 9 × 10$^{13}$ | +3 | 280 | 1.5 | 0.0 |
| 48 | 38 | 9 × 10$^{13}$ | +3 | 280 | 1.5 | 0.0 |
| 49 | 38 | 9 × 10$^{13}$ | +3 | 280 | 1.5 | 0.0 |
| 50 | 38 | 9 × 10$^{13}$ | +3 | 280 | 1.5 | 0.0 |
| 51 | 38 | 9 × 10$^{13}$ | +3 | 280 | 1.5 | 0.0 |
| 52 | 38 | 9 × 10$^{13}$ | +3 | 280 | 1.5 | 0.0 |
| 53 | 38 | 9 × 10$^{13}$ | +3 | 280 | 1.5 | 0.0 |
| 54 | 38 | 9 × 10$^{13}$ | +3 | 280 | 1.5 | 0.0 |
| 55 | 38 | 9 × 10$^{13}$ | +3 | 280 | 1.5 | 0.0 |
| 56 | 38 | 9 × 10$^{13}$ | +3 | 280 | 1.5 | 0.0 |
| 57 | 38 | 9 × 10$^{13}$ | +3 | 280 | 1.5 | 0.0 |
| 58 | 38 | 9 × 10$^{13}$ | +3 | 280 | 1.5 | 0.0 |
| 59 | 38 | 9 × 10$^{13}$ | +3 | 280 | 1.5 | 0.0 |
| 60 | 38 | 9 × 10$^{13}$ | +3 | 280 | 1.5 | 0.0 |
| 61 | 38 | 9 × 10$^{13}$ | +3 | 280 | 1.5 | 0.0 |

Evaluation 3

As shown in Table 5 and Table 6, by comparing the sample numbers 37 to 41, it was confirmed that when Mg is included by 0.02 to 1.5 mol % and preferably 0.10 to 1.0 mol % with respect to 100 mol % of the main component, the permittivity and insulation resistance were high, the capacity change rate was small, the accelerated lifetime was long and the insulation resistance defect rate was log.

Also, as shown in Table 5 and Table 6, by comparing the sample numbers 37 to 61, it was confirmed that even when at least one of Nb, Mo, Ta and W or at least one of rare earth elements including Sc and Y is included (when including at least one of Sc, Y, La, Ce, Pr, Nd, Sm, Eu, Gd, Tb, Dy, Ho, Er, Tm, Yb and Lu) instead of Mg, the equivalent effects to those in the case of including Mg were confirmed to be obtained.

EXAMPLE 4

Other than weighing the materials, so that a composition after firing would be the composition shown in Table 7 below, capacitor samples were produced in the same way as in the example 1, and the same evaluation was made as that in the example 1. The results are shown in Table 8.

TABLE 7

| Sample No. | Main Component Mole Ratios in $[(Ca_xSr_{1-x})O]_m[(Ti_yZr_{1-y-z}Hf_z)O_2]$ | | | | | | Subcomponent 1 mol % with respect to 100 mol of Main Component | | Glass Component $[(Ba_vCa_{1-v})O]_wSiO_2$ Mole Ratios | | | Adding Quantity mol % | Subcomponent 2 mol % with respect to 100 mol of Main Component | |
|---|---|---|---|---|---|---|---|---|---|---|---|---|---|---|
| | x | 1 − x | y | 1 − y − z | z | m | MnO | Al2O3 | v | 1 − v | w | | Additive | Adding Quantity |
| 62 | 0.7 | 0.3 | 0.05 | 0.9 | 0.05 | 1.000 | 1 | 0.5 | 0.5 | 0.5 | 1 | 3 | — | — |
| 63 | 0.7 | 0.3 | 0.05 | 0.9 | 0.05 | 1.005 | 1 | 0.5 | 0.5 | 0.5 | 1 | 3 | — | — |
| 64 | 0.7 | 0.3 | 0.05 | 0.9 | 0.05 | 1.015 | 1 | 0.5 | 0.5 | 0.5 | 1 | 3 | — | — |
| 65 | 0.7 | 0.3 | 0.05 | 0.9 | 0.05 | 1.025 | 1 | 0.5 | 0.5 | 0.5 | 1 | 3 | — | — |
| 66 | 0.7 | 0.3 | 0.05 | 0.9 | 0.05 | 1.040 | 1 | 0.5 | 0.5 | 0.5 | 1 | 3 | — | — |

TABLE 8

| Sample No. | Electric Characteristics | | | | | |
|---|---|---|---|---|---|---|
| | Permittivity ϵ | Insulation Resistance IR (Ω) | Capacity Change Rate ΔC/C(ppm/° C.) | Accelerated Lifetime (h) | Crystal Average Particle Diameter (μm) | note) Insulation Resistance Defect Rate (%) |
| 62 | 38 | $9 \times 10^{13}$ | +3 | 280 | 1.5 | 0.0 |
| 63 | 39 | $1 \times 10^{14}$ | +2 | 290 | 1.1 | 0.0 |
| 64 | 42 | $3 \times 10^{14}$ | +1 | 305 | 0.8 | 0.0 |
| 65 | 39 | $1 \times 10^{14}$ | +2 | 290 | 1.1 | 0.0 |
| 66 | 38 | $9 \times 10^{13}$ | +3 | 280 | 1.5 | 0.0 |

Evaluation 4

As shown in Table 7 and Table 8, by comparing sample numbers 62 to 66, it was confirmed that particularly when $1.005 \leq m \leq 1.025$ was satisfied in the main component including a dielectric oxide having a composition expressed by $[(Ca_xSr_{1-x})O]_m[(Ti_yZr_{1-y-z}Hf_z)O_2]$, the permittivity and insulation resistance were furthermore higher, the capacity change rate was furthermore smaller, the accelerated lifetime was furthermore longer, an average particle diameter of the crystal was small and the insulation resistance defect rate was low.

EXAMPLE 5

Other than weighing the materials, so that a composition after firing would be the composition shown in Table 9 below, capacitor samples were produced in the same way as in the example 1, and the same evaluation was made as that in the example 1. The results are shown in Table 9.

TABLE 9

| Sample No. | Main Component Mole Ratios in $[(Ca_xSr_{1-x})O]_m[(Ti_yZr_{1-y-z}Hf_z)O_2]$ | | | | | | Subcomponent 1 mol % with respect to 100 mol of Main Component | | | Glass Component $[(Ba_vCa_{1-v})O]_wSiO_2$ Mole Ratios | | | Adding Quantity mol % | Subcomponent 2 mol % with respect to 100 mol of Main Component | |
|---|---|---|---|---|---|---|---|---|---|---|---|---|---|---|---|
| | x | 1 − x | y | 1 − y − z | z | m | MnO | Al2O3 | V2O5 | v | 1 − v | w | | Additive | Adding Quantity |
| 3 | 0.7 | 0.3 | 0.05 | 0.9 | 0.05 | 1 | 1 | 0.5 | 0 | 0.5 | 0.5 | 1 | 3 | — | — |
| 67 | 0.7 | 0.3 | 0.05 | 0.9 | 0.05 | 1 | 1 | 0.5 | 0.5 | 0.5 | 0.5 | 1 | 3 | — | — |

TABLE 9-continued

| | Main Component Mole Ratios in [(Ca$x$Sr1−$x$)O]$m$[(Ti$y$Zr1−$y$−$z$Hf$z$)O2] | | | | | Subcomponent 1 mol % with respect to 100 mol of Main Component | | | Glass Component [(Ba$v$Ca1−$v$)O]$w$SiO2 Mole Ratios | | | Adding Quantity | Subcomponent 2 mol % with respect to 100 mol of Main Component | |
|---|---|---|---|---|---|---|---|---|---|---|---|---|---|---|
| Sample No. | x | 1 − x | y | 1 − y − z | z | m | MnO | Al2O3 | V2O5 | v | 1 − v | w | mol % | Adding Additive | Quantity |
| 68 | 0.7 | 0.3 | 0.05 | 0.9 | 0.05 | 1 | 1 | 0.5 | 2.5 | 0.5 | 0.5 | 1 | 3 | — | — |
| ✗69 | 0.7 | 0.3 | 0.05 | 0.9 | 0.05 | 1 | 1 | 0.5 | 3.0 | 0.5 | 0.5 | 1 | 3 | — | — |

TABLE 10

| | Electric Characteristics | | | | | |
|---|---|---|---|---|---|---|
| Sample No. | Permittivity ε | Insulation Resistance IR (Ω) | Capacity Change Rate ΔC/C (ppm/° C.) | Accelerated Lifetime (h) | Crystal Average Particle Diameter (μm) | note) Insulation Resistance Defect Rate (%) |
| 3 | 38 | 9 × 10$^{13}$ | +3 | 280 | 1.5 | 0.0 |
| 67 | 38 | 6 × 10$^{13}$ | +3 | 295 | 1.4 | 0.0 |
| 68 | 37 | 1 × 10$^{13}$ | +5 | 305 | 1.2 | 0.0 |
| ✗69 | 20 | 1 × 10$^{9}$ | +4 | 50 | 0.9 | — |

Evaluation 5

As shown in Table 9 and Table 10, by comparing the sample numbers 3 and 67 to 69, it was confirmed that when a V oxide was included by 0 to 2.5 mol % and preferably 0.5 to 2.5 mol %, the permittivity and insulation resistance were high, the capacity change rate was small, the accelerated lifetime was long and the insulation resistance defect rate was low. Particularly, when a V oxide was included by 0.5 to 2.5 mol %, the accelerated lifetime exhibited preferable results.

EXAMPLE 6

Other than changing the main firing temperature in a range of 1220 to 1330° C. as shown in Table 11 in the composition of the sample number 3 in the example 1, capacitor samples were produced in the same way as in the example 1 and an evaluation was made in the same way as in the example 1. The results are shown in Table 11. Note that, in the present embodiment, dielectric loss (tan δ) of the capacitor samples was also measured by an LCR meter under a condition of 140° C. and 20 Hz. Also, the results of measuring temperature dependency by tan δ in the capacitor samples are shown in FIG. 4B.

TABLE 11

| Sample No. | Firing Temperature T (° C.) | Permittivity ε | Insulation Resistance IR (Ω) | Capacity Change Rate ΔC/C (ppm/° C.) | Accelerated Lifetime (h) | Crystal Average Particle Diameter (μm) | note) Insulation Resistance Defect Rate(%) | tan δ at 20 Hz and 140° C. |
|---|---|---|---|---|---|---|---|---|
| 70 | 1220 | 33 | 2 × 10$^{13}$ | +3 | 290 | 0.9 | 0.0 | 1.1 |
| 71 | 1260 | 36 | 9 × 10$^{13}$ | +4 | 265 | 1.5 | 0.0 | 1.1 |
| 72 | 1300 | 45 | 1 × 10$^{14}$ | +5 | 270 | 1.6 | 0.0 | 0.9 |
| 73 | 1330 | 52 | 1 × 10$^{10}$ | +10 | 20 | 2.6 | 0.0 | 0.7 |

TABLE 12

| Sample No. | Firing Temperature T (° C.) | Permittivity ε | Insulation Resistance IR (Ω) | Capacity Change Rate ΔC/C (ppm/° C.) | Accelerated Lifetime (h) | Crystal Average Particle Diameter (μm) | note) Insulation Resistance Defect Rate(%) | tan δ at 20 Hz and 140° C. |
|---|---|---|---|---|---|---|---|---|
| 74 | 1220 | 24 | 2 × 10$^{11}$ | +18 | 150 | 0.9 | 0.0 | 2.4 |
| 75 | 1260 | 32 | 5 × 10$^{12}$ | +10 | 210 | 1.8 | 0.0 | 2.2 |
| 76 | 1300 | 38 | 9 × 10$^{13}$ | +3 | 9 | 3.2 | 10.0 | 2.0 |

REFERENCE EXAMPLE 1

Capacitor samples were produced in the same way as in the sample numbers 70 to 72 in the example 6 other than collectively fabricating a dielectric paste not by the solid-phase method but by the liquid-phase method, and in the same way as in the example 6 other than performing main firing at a temperature of 1220 to 1300° C. An evaluation was made in the same way as in the example 6. The results are shown in Table 12. Also, results of measuring temperature dependency by tan δ of capacitor samples are shown in FIG. 4A.

Evaluation 6

As shown in Table 11, in the present embodiment, since sintering is sufficiently attained at a temperature of 1300° C. or lower, it was confirmed that it was possible to be applied to the case of thinner layers.

Figure 4A:
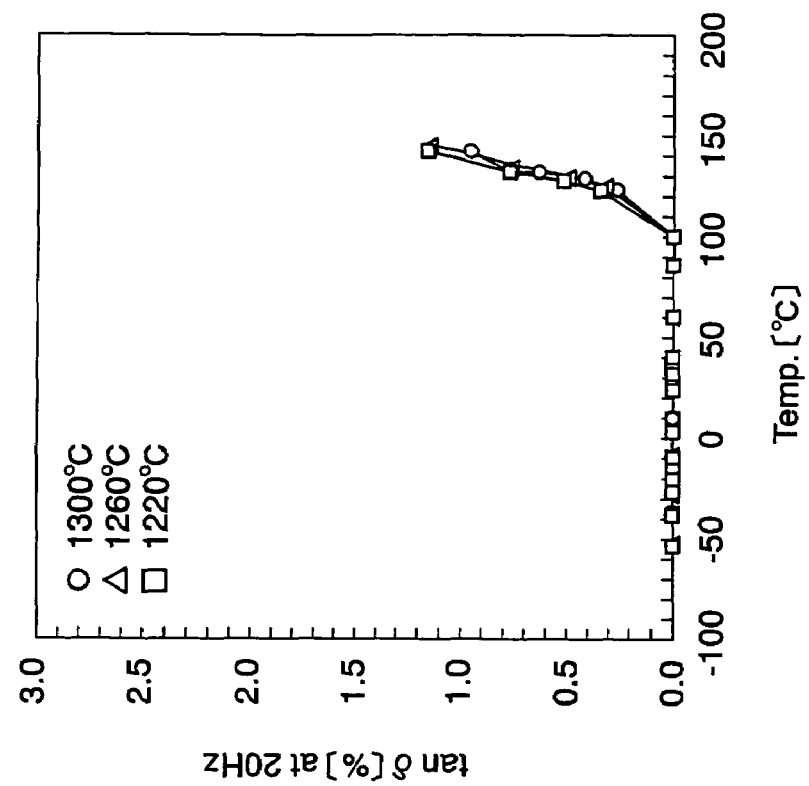
FIG. 4A is a graph of temperature dependency by tan δ in a dielectric ceramic composition obtained by the liquid-phase method.
Figure 4B:
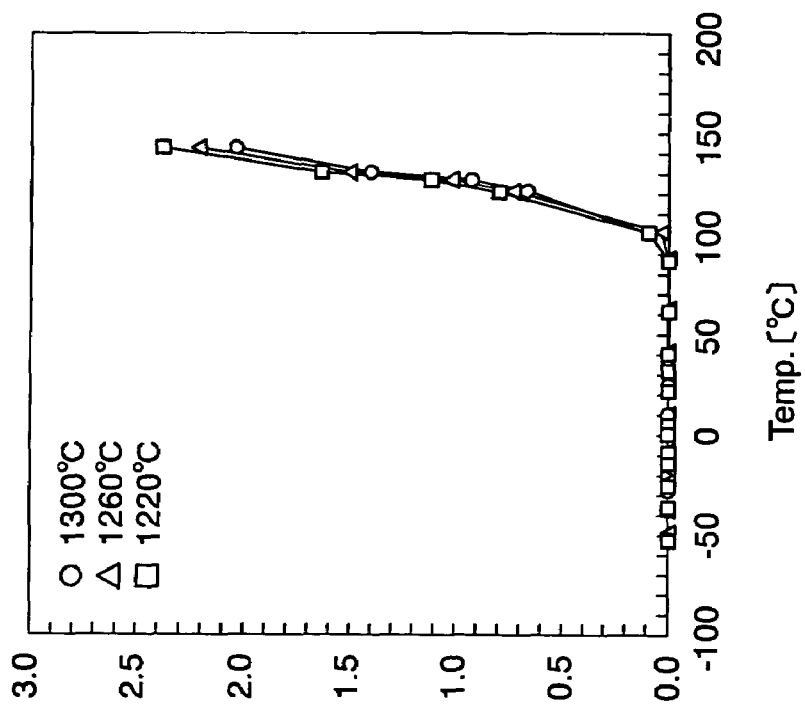
FIG. 4B is a graph of temperature dependency by tan δ in a dielectric ceramic composition obtained by the solid-phase method according to the embodiment of the present invention.

Also, as is understood by comparing Table 11 with Table 12 and FIG. 4B with FIG. 4A, it was confirmed that, by producing the dielectric paste not by the liquid-phase method but by the solid-phase method, it was possible to improve the permittivity and insulation resistance, make the capacity change rate small, improve the accelerated lifetime, and reduce tan δ at 140° C.

REFERENCE EXAMPLE 2

Other than collectively fabricating a dielectric paste having a composition of the sample number 10 (Hf is not added) in the example 1 not by the solid-phase method but by the liquid-phase method, capacitor samples were produced in the same way as in the case of the sample number 10 in the example 1 and an evaluation was made in the same way as in the example 1. The results are shown in Table 13. Note that, in the present embodiment, X-ray analysis was also performed on dielectric layers of the capacitor samples, and a CV value (variation coefficient) indicating dispersibility of respective elements in the dielectric layers was also measured as shown in Table 13.

The CV value is defined as a value obtained by calculating standard deviation D(x) from an X-ray intensity distribution of each element in the dielectric layer and dividing the standard deviation D(x) by an expectation value E(x) of the X-ray intensity distribution of each element. When the CV value is small, the dispersibility is preferable.

EXAMPLE 7

The CV value (variation coefficient) indicating dispersibility of each element in the dielectric layer was measured on capacitor samples having a composition of the sample number 3 (Hf is added) in the example 1 in the same way as in the reference example 2. The results are shown in Table 13.

As explained above, according to the present invention, it is possible to realize a highly reliable nonreducing dielectric ceramic composition, preferably used as a dielectric layer of a multilayer ceramic capacitor, etc. using a base metal, such as Ni, as an internal electrode and able to be sintered at 1300° C. or lower; wherein a temperature coefficient of the capacitance is small and able to be freely controlled in a range of −15 to +150 ppm/° C., the insulation resistance at 25° C. is $1\times10^{13}$ Ω or higher, the specific permittivity and dielectric loss tangent (tan δ) have a little frequency dependency, accelerated lifetime of the insulation resistance is long, and a insulation resistance defect rate is low even when the insulation layer is made thin.

What is claimed is:

1. A dielectric ceramic composition including at least
   a main component containing a dielectric oxide having a composition expressed by $[(Ca_xSr_{1-x})O]_m[(Ti_yZr_{1-y-z}Hf_z)O_2]$,
   a first subcomponent containing a Mn oxide and/or an Al oxide, and
   a glass component containing at least $SiO_2$ as a primary component:
   wherein "m", "x", "y" and "z" indicating composition mole ratios in the formula included in said main component are in relationships of $0.90 \leq m \leq 1.04$ $0.5 \leq x < 1$ $0.01 \leq y \leq 0.10$ $0.5 \leq z \leq 0.20$, and said dielectric ceramic composition is produced by obtaining a calcinated substance by collectively calcinating at least a main component material, which becomes said main component, a first subcomponent material, which becomes said first subcomponent, and a glass component material, which becomes said glass component, to bring solid phase reaction, and then main firing said calcinated substance.

TABLE 13

| | | | | | | note)Insulation | | | | | | | | |
|---|---|---|---|---|---|---|---|---|---|---|---|---|---|---|
| | | | Capacity | | Crystal Average | | | | | | | | | |
| Sample | Permit- | Insulation Resistance | Change Rate ΔC/C | Accelerated Lifetime | Particle Diameter | Resistance Defect | | | | Dispersibility (CV value) | | | | |
| No. | tivity ε | IR (Ω) | (ppm/° C.) | (h) | (μm) | Rate(%) | Ca | Sr | Ti | Zr | Ba | Si | Mn | Al |
| 77 | 35 | $3\times10^{13}$ | +41 | 30 | 0.9 | 2.0 | 0.191 | 0.199 | 0.677 | 0.186 | 0.715 | 0.455 | 0.425 | 0.653 |
| 3 | 38 | $9\times10^{13}$ | +3 | 280 | 1.5 | 0.0 | 0.145 | 0.151 | 0.402 | 0.177 | 0.502 | 0.219 | 0.351 | 0.418 |

Evaluation 7

In Table 13, as is known by comparing the sample number 77 with the sample number 3, by adding Hf (the sample number 3) to the main component, moreover, by applying the solid-phase method instead of the liquid-phase method (the sample number 77), it was confirmed that dispersibility of respective elements (Ca, Sr, Ti, Zr, Ba, Si, Mn and Al) improved. Also, in the sample number 3 as an example, the insulation resistance and accelerated lifetime were improved and the insulation resistance defect rate was reduced.

2. The dielectric ceramic composition as set forth in claim 1, including 0.2 to 5 mol % of said Mn oxide in terms of MnO and 0.1 to 10 mol % of said Al oxide in terms of $Al_2O_3$ with respect to 100 mol % of said main component.

3. The dielectric ceramic composition as set forth in claim 1, including 0 mol % and 2.5 mol % or less of a V oxide in terms of $V_2O_5$ with respect to 100 mol % of said main component.

4. The dielectric ceramic composition as set forth in claim 1, wherein said glass component is expressed by $[(Ba_vCa_{1-v})O]_wSiO_2$, "v" and "w" in the composition formula of said glass component are in ranges of $0 \leq v \leq 1$ and $0.5 \leq w \leq 4.0$, and said glass component is included by 0.5 to 15 mol % with respect to 100 mol % of said main component.

5. The dielectric ceramic composition as set forth in claim 1, including at least one of rare earth elements including elements selected from the group consisting of Sc, Y, La, Ce, Pr, Nd, Pm, Sm, Eu, Gd, Tb, Dy, Ho, Er, Tm, Yb and Lu by 0.02 to 1.5 mol % with respect to 100 mol % of said main component.

6. The dielectric ceramic composition as set forth in claim 1, including at least one of Nb, Mo, Ta, W and Mg by 0.02 to 1.5 mol % with respect to 100 mol % of said main component.

7. The dielectric ceramic composition as set forth in claim 1, wherein "m" indicating a composition mole ratio in the formula contained in said main component is $1.005 \leq m \leq 1.025$.

8. A production method of the dielectric ceramic composition as set forth in claim 1, comprising the steps of:
    preparing at least said main component material, said first subcomponent material and said glass component material;
    mixing said prepared materials;
    obtaining a calcinated substance by collectively calcinating said mixed materials to bring solid-phase reaction by using a dry synthesis method; and
    obtaining said dielectric ceramic composition by performing main firing on said calcinated substance.

9. An electronic device having a dielectric layer:
    wherein said dielectric layer is composed of the dielectric ceramic composition as set forth in claim 1.

10. An electronic device having alternately stacked internal electrodes and dielectric layers, wherein said dielectric layers are composed of the dielectric ceramic composition as set forth in claim 1.

11. The electronic device as set forth in claim 10, wherein said internal electrode includes at least nickel.

12. The electronic device as set forth in claim 10, wherein an average particle diameter of a crystal in said dielectric layer is 2 μm or less.

13. A production method of the electronic device as set forth in claim 10, comprising the steps of:
    preparing at least said main component material, said first subcomponent material and said glass component material;
    mixing said prepared materials;
    obtaining a calcinated substance by collectively calcinating said mixed materials to bring solid-phase reaction by using a dry synthesis method;
    obtaining a green chip comprising by stacking a dielectric paste containing said calcinated substance and internal electrode paste; and
    performing main firing on said green chip at 1300° C. or lower.

* * * * *